United States Patent
Kato (10) Patent No.: US 8,830,368 B2
(45) Date of Patent: Sep. 9, 2014

(54) SOLID-STATE IMAGING DEVICE

(71) Applicant: Olympus Corporation, Tokyo (JP)

(72) Inventor: Hideki Kato, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 13/838,838

(22) Filed: Mar. 15, 2013

(65) Prior Publication Data

US 2013/0250151 A1 Sep. 26, 2013

(30) Foreign Application Priority Data

Mar. 22, 2012 (JP) ................. 2012-065461

(51) Int. Cl.
- *H04N 3/14* (2006.01)
- *H04N 5/335* (2011.01)
- *H04N 5/3745* (2011.01)
- *H01L 27/146* (2006.01)

(52) U.S. Cl.
CPC ........... *H04N 5/335* (2013.01); *H04N 5/37452* (2013.01); *H04N 5/3745* (2013.01)
USPC ............................. 348/300; 348/308; 257/443

(58) Field of Classification Search
USPC .......... 348/294, 300–302, 308; 257/443, 777, 257/778; 250/208.1, 214.1
See application file for complete search history.

(56) References Cited

U.S. PATENT DOCUMENTS

| | | | |
|---|---|---|---|
| 2008/0278614 A1* | 11/2008 | Ohtsuki et al. | 348/308 |
| 2010/0073537 A1* | 3/2010 | Kato et al. | 348/300 |
| 2010/0079648 A1* | 4/2010 | Totsuka et al. | 348/308 |
| 2012/0026371 A1* | 2/2012 | Itano et al. | 348/301 |
| 2012/0050598 A1* | 3/2012 | Kinugasa et al. | 348/327 |
| 2012/0086841 A1* | 4/2012 | Ono et al. | 348/300 |

FOREIGN PATENT DOCUMENTS

| | | |
|---|---|---|
| JP | 2006-49361 A | 2/2006 |
| JP | 2010-219339 A | 9/2010 |

* cited by examiner

*Primary Examiner* — Kelly L Jerabek
(74) *Attorney, Agent, or Firm* — Westerman, Hattori, Daniels & Adrian, LLP (57) ABSTRACT

In a solid-state imaging device, an amplification transistor amplifies a signal generated by a photoelectric conversion unit and outputs the amplified signal. An analog memory accumulates the amplified signal output from the amplification transistor. A select transistor electrically connects the analog memory to a vertical signal line and selects any one of a first state in which the amplified signal accumulated in the analog memory is output to the vertical signal line and a second state in which the analog memory is electrically disconnected from the vertical signal line. A differential amplification circuit includes a first input terminal connected to a reference voltage and a second input terminal connected to the vertical signal line.

7 Claims, 6 Drawing Sheets

SOLID-STATE IMAGING DEVICE

BACKGROUND OF THE INVENTION

1. Field of the Invention

The present invention relates to a solid-state imaging device in which first and second substrates provided with circuit elements constituting each pixel are electrically connected.

Priority is claimed on Japanese Patent Application No. 2012-065461, filed Mar. 22, 2012, the content of which is incorporated herein by reference.

2. Description of Related Art

In recent years, video cameras, electronic still cameras, and the like have been proliferated generally and widely. In such cameras, charge coupled device (CCD) type or amplification type solid-state imaging devices have been used. In the amplification type solid-state imaging device, a signal charge generated and accumulated by a photoelectric conversion unit of each pixel on which light is incident is guided to an amplification unit installed in the pixel, and then a signal amplified by the amplification unit is output from the pixel. In the amplification type solid-state imaging device, the plurality of pixels are arrayed in a two-dimensional matrix form. An example of the amplification type solid-state imaging device includes a complementary metal oxide semiconductor (CMOS) type solid-state imaging device using a CMOS transistor.

According to the related art, a general CMOS type solid-state imaging device adopts a method of sequentially reading signal charges generated by the photoelectric conversion units of the respective pixels arrayed in the two-dimensional matrix form for each row. In this method, exposure timing is different for each row, since the exposure timing in the photoelectric conversion unit of each pixel is determined by a beginning and end of reading of the signal charges.

Further, the CMOS type solid-state imaging device having a global shutter function has been applied for many uses. The CMOS type solid-state imaging device having the global shutter function is generally required to include an accumulation capacitor unit having a light shielding property in order to store the signal charge generated by the photoelectric conversion unit until the signal charge is read. In the CMOS type solid-state imaging device according to the related art, after all of the pixels are simultaneously exposed, the signal charges generated by the respective photoelectric conversion units are simultaneously transmitted to the accumulation capacitor units and are temporarily accumulated in all of the pixels. Then, the signal charges are sequentially converted into pixel signals at predetermined reading timings to be read.

Japanese Unexamined Patent Application, First Publication No. 2006-49361 discloses a solid-state imaging device configured such that a MOS image sensor chip in which a micropad is formed for each unit cell on a wiring layer side and a signal processing chip in which a micropad is formed on the wiring layer side at a position corresponding to the micropad of the MOS image sensor chip are connected by a microbump. Further, Japanese Unexamined Patent Application, First Publication No. 2010-219339 discloses a method of suppressing an increase in a chip area in a solid-state imaging device in which a first substrate provided with photoelectric conversion units and a second substrate provided with a plurality of MOS transistors are bonded.

SUMMARY OF THE INVENTION

According to a first aspect of the invention, there is provided a solid-state imaging device in which first and second substrates in which circuit components constituting each pixel are arranged are electrically connected to each other. The pixels includes a photoelectric conversion unit that is arranged in the first substrate, an amplification circuit that amplifies a signal generated by the photoelectric conversion unit and outputs the amplified signal, a signal accumulation circuit that is arranged in the second substrate and accumulates the amplified signal output from the amplification circuit, a selection circuit that electrically connects the signal accumulation circuit to a vertical signal line and selects one of a first state in which the amplified signal accumulated in the signal accumulation circuit is output to the vertical signal line and a second state in which the signal accumulation circuit is electrically disconnected from the vertical signal line, and a differential amplification circuit that includes a first input terminal connected to a predetermined voltage and a second input terminal connected to the vertical signal line.

According to a second aspect of the invention, in the solid-state imaging device of the first aspect, the predetermined voltage may be a voltage which is the same as a voltage applied to a clamp unit, when the clamp unit starts clamping the amplified signal.

According to a third aspect of the invention, the solid-state imaging device of the second aspect may further include a feedback switch that switches between an ON state and an OFF state; and a feedback capacitor. The vertical signal line, one end of the feedback switch, and one end of the feedback capacitor may be connected to the second input terminal of the differential amplification circuit. The other end of the feedback switch and the other end of the feedback capacitor may be connected to an output terminal of the differential amplification circuit.

According to a fourth aspect of the invention, in the solid-state imaging device of the third aspect, the differential amplification circuit may amplify the amplified signal output to the vertical signal line at an amplification ratio corresponding to the signal accumulation circuit and the feedback capacitor.

According to a fifth aspect of the invention, in the solid-state imaging device of the fourth aspect may further include a noise reduction circuit that reduces noise in the amplified signal output from the amplification circuit.

According to a sixth aspect of the invention, in the solid-state imaging device of the fifth aspect, the noise reduction circuit may remove at least one of noise which is generated in an input unit of the amplification circuit due to originate from an operation of a circuit connected to the amplification circuit and noise which originates from operation characteristics of the amplification circuit.

According to a seventh aspect of the invention, in the solid-state imaging device of the sixth aspect, the noise reduction circuit may include a clamp unit that clamps the amplified signal output from the amplification circuit and a sample-and-hold unit that samples and holds a signal according to the amplified signal clamped by the clamp unit and accumulates the signal in the signal accumulation circuit.

DETAILED DESCRIPTION OF THE INVENTION

Figure 1:
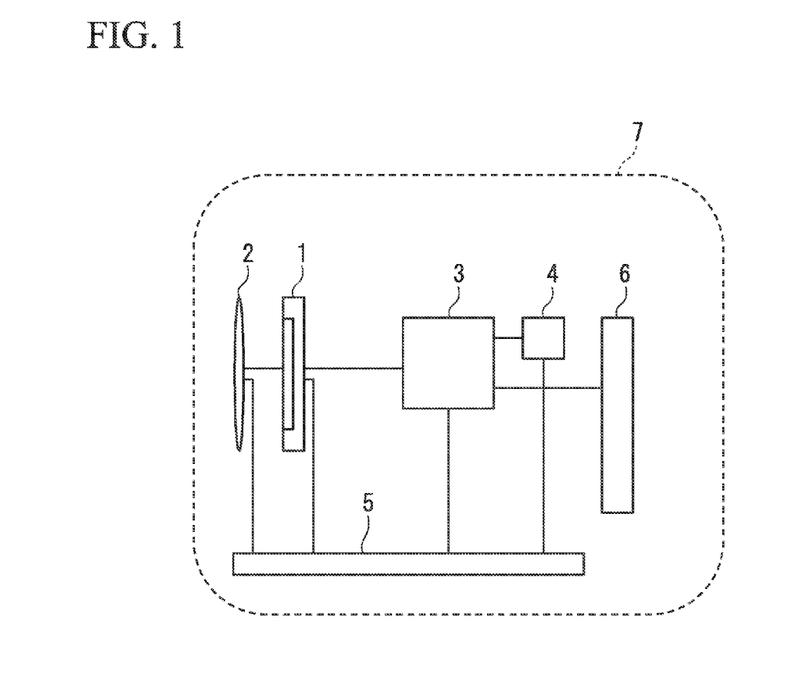
FIG. 1 is a block diagram illustrating the configuration of a digital camera according to an embodiment of the invention.

Hereinafter, an embodiment of the invention will be described with reference to the drawings. FIG. 1 is a diagram illustrating the configuration of a digital camera which is an example of an imaging device according to this embodiment. As shown in FIG. 1, a digital camera 7 includes a solid-state imaging device 1, a lens unit 2, an image processing device 3, a recording device 4, a camera control device 5, and a display device 6.

The lens unit 2 includes an optical system such as a lens and forms a subject image formed by light from a subject in the solid-state imaging device 1. Driving of a zoom, a focus, a diaphragm, and the like of the lens unit 2 is controlled by the camera control device 5. The solid-state imaging device 1 is a MOS type imaging device that converts light of the subject incident in the digital camera 7 via the lens unit 2 into an image signal.

Driving of the solid-state imaging device 1 is controlled by the camera control device 5. The solid-state imaging device 1 will be described in detail below.

The image processing device 3 performs a process such as a process of amplifying the image signal output from the solid-state imaging device 1 or a process of converting the image signal into image data and performs processes such as various corrections or compressions on the converted image data. The recording device 4 is possible to be a recording medium capable of being detachably mounted such as a semiconductor memory and perform recording and reading of image data. The display device 6 is a liquid crystal display device and so on that displays image data based on the image signal output from the solid-state imaging device 1 or an image based on the image data read from the recording device 4.

Figure 2:
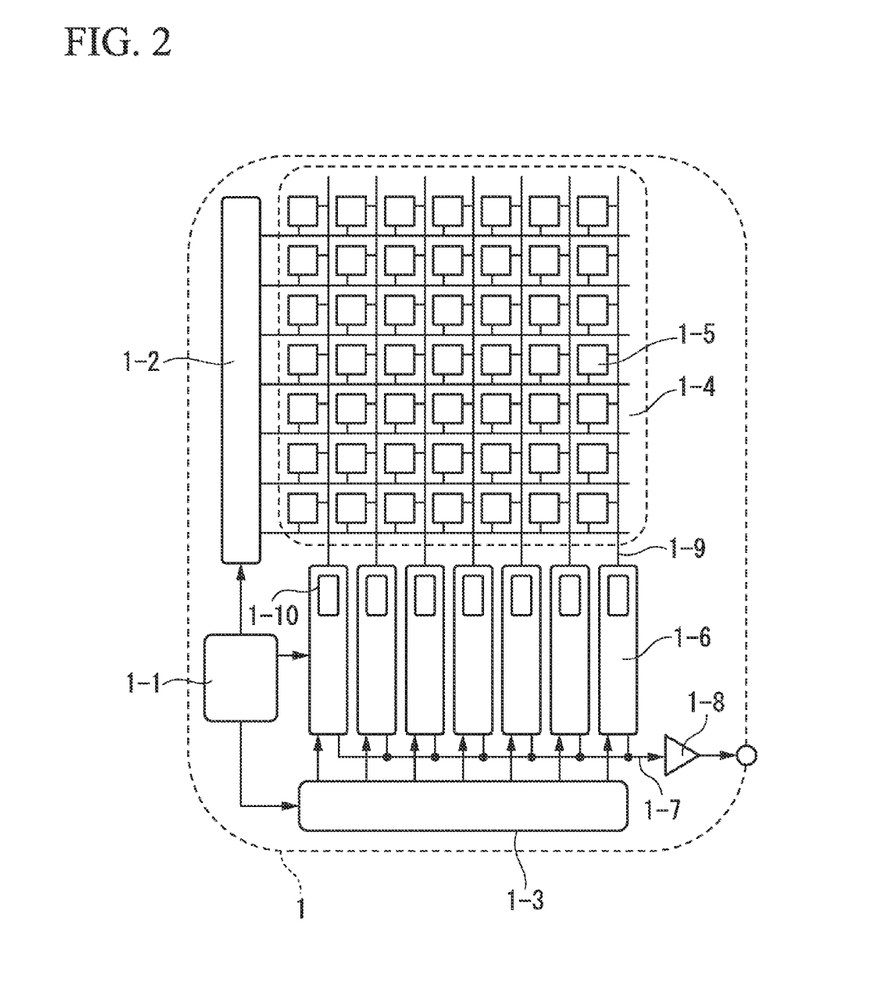
FIG. 2 is a block diagram illustrating the configuration of a solid-state imaging device according to the embodiment of the invention.

FIG. 2 is a diagram illustrating the configuration of the solid-state imaging device 1. As shown in FIG. 2, the solid-state imaging device 1 includes a control signal generation circuit 1-1, a vertical reading control circuit 1-2, a horizontal reading control circuit 1-3, a pixel array unit 1-4 including a plurality of unit pixels 1-5, column signal processing units 1-6, and an output circuit 1-8.

The control signal generation circuit 1-1 generates a control signal used to control the vertical reading control circuit 1-2, the horizontal reading control circuit 1-3, and the column signal processing units 1-6, and then supplies the control signal thereto. The vertical reading control circuit 1-2 controls the respective unit pixels 1-5 within the pixel array unit 1-4 in units of rows and outputs a pixel signal of each unit pixel 1-5 to a vertical signal line 1-9 installed in each column. The control performed on the unit pixels 1-5 by the vertical reading control circuit 1-2 includes a reset operation, an accumulation operation, and a signal reading operation on the unit pixels 1-5. To perform the control, the vertical reading control circuit 1-2 outputs a control signal (control pulse) to each unit pixel 1-5 and independently controls the unit pixels 1-5 for each row.

In the pixel array unit 1-4, the plurality of unit pixels 1-5 are arrayed in a two-dimensional matrix form. In FIG. 2, 49 unit pixels 1-5 in 7 rows×7 columns are arrayed, but the array of the unit pixels 1-5 shown in FIG. 2 is merely an example. The number of rows and the number of columns may be 2 or more.

The column signal processing unit 1-6 is connected to the vertical signal line 1-9 installed for each column and includes a column amplification circuit 1-10. The column amplification circuit 1-10 performs signal processing such as noise suppression or signal amplification before A/D conversion on the pixel signal output to the vertical signal line 1-9. The horizontal reading control circuit 1-3 sequentially reads output signals of the column signal processing units 1-6 to a horizontal signal line 1-7. The signals read to the horizontal signal line 1-7 are output to the outside of the solid-state imaging device 1 via the output circuit 1-8.

Figure 3A:
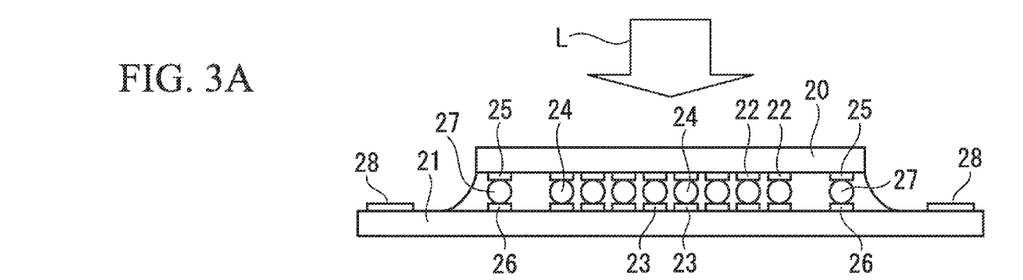
FIG. 3A is a sectional view illustrating the solid-state imaging device according to the embodiment of the invention.
Figure 3B:
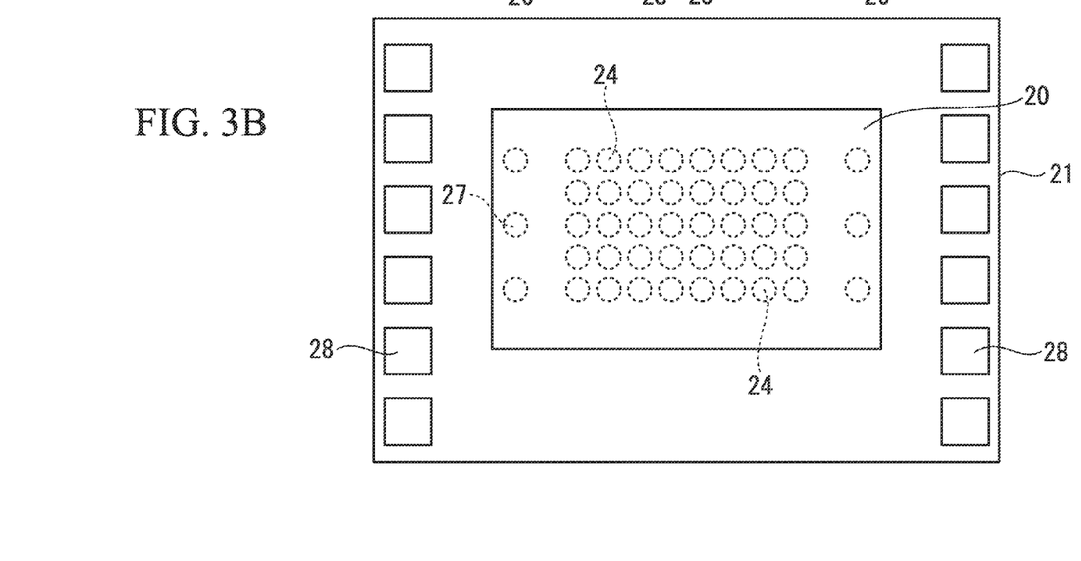
FIG. 3B is a plan view illustrating the solid-state imaging device according to the embodiment of the invention.

FIG. 3A is a sectional view illustrating the configuration of the solid-state imaging device 1. FIG. 3B is a plan view illustrating the configuration of the solid-state imaging device 1. The solid-state imaging device 1 has a configuration in which two substrates (a first substrate 20 and a second substrate 21) provided with circuit components (photoelectric conversion units, transistors, capacitors, and the like) constituting the unit pixels 1-5 overlap each other. The circuit components constituting the unit pixels 1-5 are distributed and provided in the first substrate 20 and the second substrate 21. The first substrate 20 and the second substrate 21 are electrically connected to each other so that the two substrates are possible to transmit and receive electric signals when the unit pixels 1-5 are driven.

The photoelectric conversion units are formed on the main surface of the side irradiated with light L between two main surfaces (which are surfaces with a relatively larger surface area than the side surfaces) of the first substrate 20, and thus the light with which the first substrate 20 is irradiated is incident on the photoelectric conversion units. A plurality of micropads 22 which are electrodes for connection with the second substrate 21 are formed on the main surface of the side opposite to the main surface of the side irradiated with the light L between the two main surfaces of the first substrate 20.

One micropad 22 is disposed for each pixel or each plurality of pixels. A plurality of micropads 23 which are electrodes for connection with the first substrate 20 are formed at positions corresponding to the micropads 22 on the main surface of the side facing the first substrate 20 between the two main surfaces of the second substrate 21.

Microbumps 24 are formed between the micropads 22 and the micropads 23. The first substrate 20 and the second substrate 21 are disposed to overlap such that the micropads 22 and the micropads 23 face each other and are integrated such that the micropads 22 and the micropads 23 are electrically connected to each other by the microbumps 24. The micropad 22, the microbump 24, and the micropad 23 form a connection portion that connects the first substrate 20 to the second substrate 21. A signal based on a signal charge generated by the photoelectric conversion unit provided in the first substrate 20 is output to the second substrate 21 via the micropad 22, the microbump 24, and the micropad 23.

Micropads 25 having the same configuration as the micropads 22 are formed in the circumference of the main surface opposite to the main surface of the side irradiated with the light L between the two main surfaces of the first substrate 20. Micropads 26 having the same configuration as the micropads 23 are formed at positions corresponding to the micropads 25 on the main surface of the side facing the first substrate 20 between the two main surfaces of the second substrate 21. Microbumps 27 are formed between the micropads 25 and the micropads 26. A power-supply voltage, or the like used to drive the circuit components provided in the first substrate 20 or the circuit components provided in the second substrate 21 is supplied from the first substrate 20 to the second substrate 21 or from the second substrate 21 to the first substrate 20 via the micropads 25, the microbumps 27, and the micropads 26.

Pads 28 used as interfaces with a system other than the first substrate 20 and the second substrate 21 are formed in the circumference of one main surface between the two main surfaces of the second substrate 21. Instead of the pads 28, through electrodes penetrating the second substrate 21 may be provided and the through electrodes may be used as electrodes for external connection. In the example shown in FIGS. 3A and 3B, the areas of the main surfaces of the first substrate 20 and the second substrate 21 are different from each other, but the areas of the main surfaces of the first substrate 20 and the second substrate 21 may be the same as each other. Further, the first substrate 20 and the second substrate 21 may be connected by directly bonding the micropads (first electrodes) formed on the surface of the first substrate 20 and the micropads (second electrodes) formed on the surface of the second substrate 21 without providing the microbumps.

The circuit components constituting the unit pixels 1-5 are distributed and provided in the first substrate 20 and the second substrate 21. Aside from the unit pixels 1-5, each of the control signal generation circuit 1-1, the vertical reading control circuit 1-2, the horizontal reading control circuit 1-3, the column signal processing units 1-6, and the output circuit 1-8 may be provided in any one of the first substrate 20 and the second substrate 21. Further, circuit components constituting each of the control signal generation circuit 1-1, the vertical reading control circuit 1-2, the horizontal reading control circuit 1-3, the column signal processing units 1-6, and the output circuit 1-8 may be distributed and provided in the first substrate 20 and the second substrate 21. In the configuration other than the unit pixels 1-5, a signal is required to be transmitted and received between the first substrate 20 and the second substrate 21 in some cases. However, the first substrate 20 and the second substrate 21 may be connected using micropads and microbumps, as in the unit pixels 1-5. Alternatively, the first substrate 20 and the second substrate 21 may be connected by directly connecting the micropads to each other.

Figure 4:
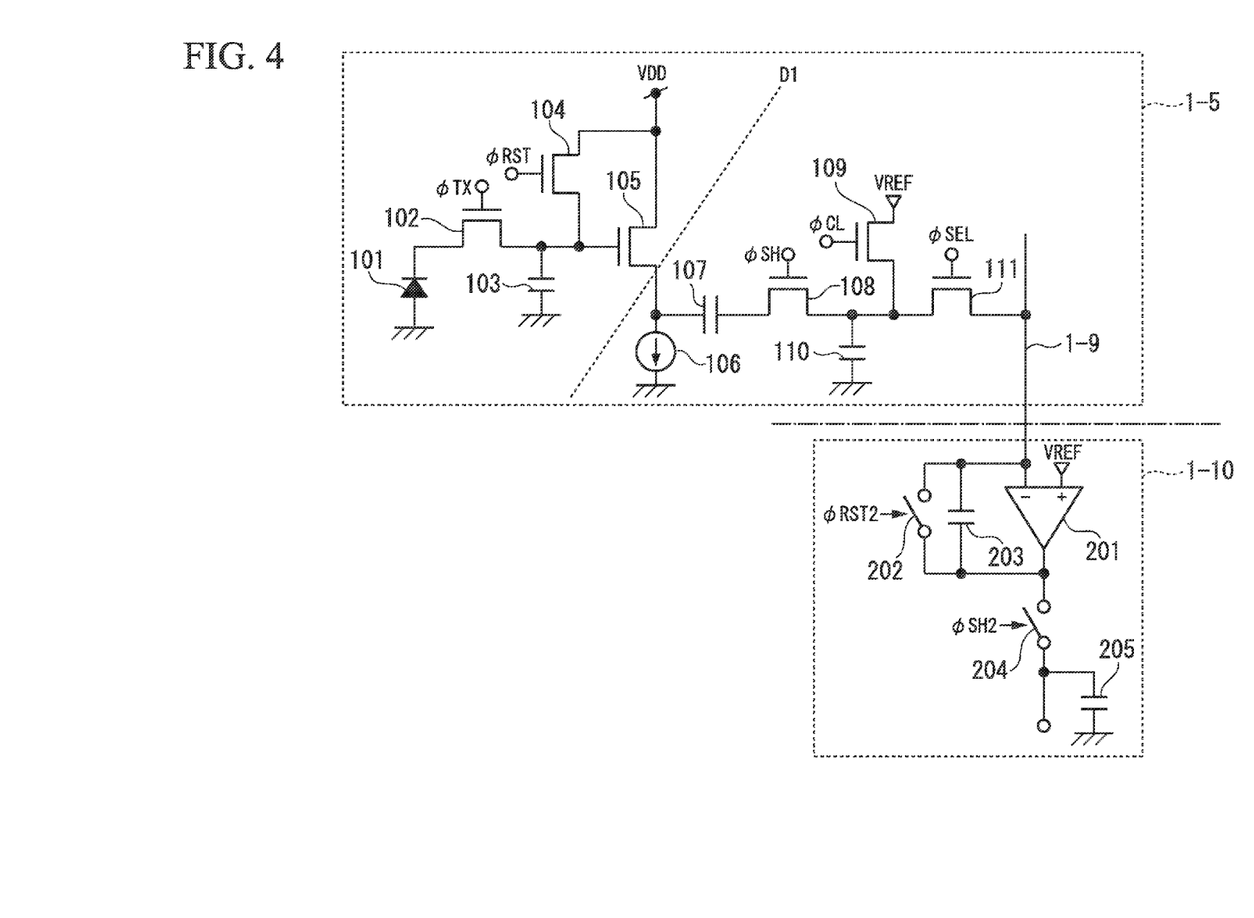
FIG. 4 is a circuit diagram illustrating circuit configurations of a unit pixel and a column amplification circuit of the solid-state imaging device according to the embodiment of the invention.

FIG. 4 is a diagram illustrating the configuration of the unit pixel 1-5 and the configuration of the column amplification circuit 1-10 of the column signal processing unit 1-6 corresponding to one column.

The unit pixel 1-5 includes a photoelectric conversion unit 101, a transmission transistor 102, an FD (floating diffusion) 103, an FD reset transistor 104, an amplification transistor 105, a current source 106, a clamp capacitor 107, a sampling transistor 108, an analog memory reset transistor 109, an analog memory 110, and a select transistor 111.

One end of the photoelectric conversion unit 101 is grounded. A drain terminal of the transmission transistor 102 is connected to the other end of the photoelectric conversion unit 101. A gate terminal of the transmission transistor 102 is connected to the vertical reading control circuit 1-2 and is thus supplied with a transmission pulse ΦTX.

One end of the FD 103 is connected to a source terminal of the transmission transistor 102 and the other end of the FD 103 is grounded. A drain terminal of the FD reset transistor 104 is connected to a power-supply voltage VDD and a source terminal of the FD reset transistor 104 is connected to the source terminal of the transmission transistor 102. A gate terminal of the FD reset transistor 104 is connected to the vertical reading control circuit 1-2 and is thus supplied with an FD reset pulse ΦRST.

A drain terminal of the amplification transistor 105 is connected to the power-supply voltage VDD. A gate terminal which is an input unit of the amplification transistor 105 is connected to the source terminal of the transmission transistor 102.

One end of the current source 106 is connected to a source terminal of the amplification transistor 105 and the other end of the current source 106 is grounded. For example, the current source 106 may be configured by a transistor in which a drain terminal is connected to the source terminal of the amplification transistor 105, a source terminal is grounded, and a gate terminal is connected to the vertical reading control circuit 1-2. One end of the clamp capacitor 107 is connected to the source terminal of the amplification transistor 105 and the one end of the current source 106.

A drain terminal of the sampling transistor 108 is connected to the other end of the clamp capacitor 107. A gate terminal of the sampling transistor 108 is connected to the vertical reading control circuit 1-2 and is thus supplied with a sample pulse ΦSH.

A drain terminal of the analog memory reset transistor 109 is connected to a reference voltage VREF and a source terminal of the analog memory reset transistor 109 is connected to a source terminal of the sampling transistor 108. A gate terminal of the analog memory reset transistor 109 is connected to the vertical reading control circuit 1-2 and is thus supplied with a clamp & memory reset pulse ΦCL.

One end of the analog memory 110 is connected to the source terminal of the sampling transistor 108 and the other of the analog memory 110 is grounded. A drain terminal of the select transistor 111 is connected to the source terminal of the sampling transistor 108 and a source terminal of the select transistor 111 is connected to the vertical signal line 1-9. A gate terminal of the select transistor 111 is connected to the vertical reading control circuit 1-2 and is thus supplied with a select pulse ΦSEL. The source terminal and the drain terminal of each transistor described above may be reversed by reversing the polarity of each transistor.

The photoelectric conversion unit 101 is, for example, a photodiode and creates (generates) a signal charge based on incident light. The photoelectric conversion unit 101 retains and accumulates the created (generated) signal charge. The transmission transistor 102 is a transistor that transmits the signal charge accumulated in the photoelectric conversion unit 101 to the FD 103. ON/OFF of the transmission transistor 102 is controlled by the transmission pulse ΦTX from the vertical reading control circuit 1-2. The FD 103 is a capacitor that temporarily retains and accumulates the signal charges transmitted from the photoelectric conversion unit 101.

The FD reset transistor 104 is a transistor that resets the FD 103. ON/OFF of the FD reset transistor 104 is controlled by the FD reset pulse ΦRST from the vertical reading control circuit 1-2. The photoelectric conversion unit 101 may be reset by simultaneously turning on the FD reset transistor 104 and the transmission transistor 102. Resetting the FD 103/the photoelectric conversion unit 101 means controlling the amount of charge accumulated in the FD 103/the photoelectric conversion unit 101 and setting the state (potential) of the FD 103/the photoelectric conversion unit 101 to a reference state (a reference potential or a reset level).

The amplification transistor 105 is a transistor that outputs an amplified signal, which is obtained by amplifying a signal based on the signal charge input to the gate terminal and accumulated in the FD 103, from the source terminal. The current source 106 functions as a load of the amplification transistor 105 and supplies a current used to drive the amplification transistor 105 to the amplification transistor 105. The amplification transistor 105 and the current source 106 form a source follower circuit.

The clamp capacitor 107 is a capacitor that clamps (fixes) a voltage level of the amplified signal output from the amplification transistor 105. The sampling transistor 108 is a transistor that samples and holds the voltage level of the other end of the clamp capacitor 107 and accumulates the voltage level in the analog memory 110. ON/OFF of the sampling transistor 108 is controlled by the sample pulse ΦSH from the vertical reading control circuit 1-2.

The analog memory reset transistor 109 is a transistor that resets the analog memory 110. Resetting the analog memory 110 means controlling the amount of charge accumulated in the analog memory 110 and setting the state (potential) of the analog memory 110 to a reference state (a reference potential or a reset level). The analog memory 110 retains and accumulates the analog signal sampled and held by the sampling transistor 108.

The capacity of the analog memory 110 is set to a capacity larger than the capacity of the FD 103. In the analog memory 110, a metal insulator metal (MIM) capacitor or a metal oxide semiconductor (MOS) capacitor which is a capacitor with a small leakage current (dark current) per unit area is preferably used. Thus, the noise tolerance is possible to be improved, and thus a high-quality signal is possible to be obtained.

The select transistor 111 is a transistor that selects the unit pixels 1-5 and transmits the signal level accumulated in the capacitor of the analog memory 110 to the vertical signal line 1-9. The select transistor 111 performs ON/OFF switching to select any one of a state in which one end of the analog memory 110 is electrically connected to the vertical signal line 1-9 and a signal based on the signal charge accumulated in the analog memory 110 is thus output to the vertical signal line 1-9 and a state in which the one end of the analog memory 110 is electrically disconnected from (not connected with) the vertical signal line 1-9. ON/OFF of the select transistor 111 is controlled by the select pulse (MEL from the vertical reading control circuit 1-2.

Among the circuit components shown in FIG. 4, the photoelectric conversion unit 101 is provided in the first substrate 20, the analog memory 110 is provided in the second substrate 21, and the other circuit components are provided in any one of the first substrate 20 and the second substrate 21. A dotted line D1 in FIG. 4 indicates a boundary between the first substrate 20 and the second substrate 21. The photoelectric conversion unit 101, the transmission transistor 102, the FD 103, the FD reset transistor 104, and the amplification transistor 105 are provided in the first substrate 20. The current source 106, the clamp capacitor 107, the sampling transistor 108, the analog memory reset transistor 109, the analog memory 110, and the select transistor 111 are provided in the second substrate 21.

The amplified signal output from the amplification transistor 105 in the first substrate 20 is output to the second substrate 21 via the micropad 22, the microbump 24, and the micropad 23. Further, the power-supply voltage VDD is transmitted and received between the first substrate 20 and the second substrate 21 via the micropads 25, the microbumps 27, and the micropads 26.

In FIG. 4, the connection portion including the micropad 22, the microbump 24, and the micropad 23 is disposed in a pathway among the source terminal of the amplification transistor 105, the one end of the current source 106, and the one end of the clamp capacitor 107, but the invention is not limited thereto. The connection portion may be disposed at any position on a pathway electrically connected from the photoelectric conversion unit 101 to the analog memory 110.

The column amplification circuit 1-10 includes a differential amplification circuit 201, a reset switch 202, a negative feedback capacitor 203, an SH switch 204, and a sample capacitor 205. The differential amplification circuit 201 includes a first input terminal (+), a second input terminal (−), and an output terminal.

The first input terminal (+) of the differential amplification circuit 201 is connected to a reference voltage VREF. The reference voltage VREF is the same as the reference voltage VREF (in other words, the reference voltage VREF applied to the other end of the clamp capacitor 107 when the clamp capacitor 107 starts clamping the amplified signal output from the amplification transistor 105) applied when the one end of the analog memory 110 in the unit pixel 1-5 is reset.

The second input terminal (−) of the differential amplification circuit 201 is connected to the vertical signal line 1-9. One end of the negative feedback capacitor 203 and one end of the reset switch 202 are connected to the second input terminal (−) of the differential amplification circuit 201. The other end of the negative feedback capacitor 203 and the other end of the reset switch 202 are connected to the output terminal of the differential amplification circuit 201. In the above-described configuration, a pixel signal output from the unit pixel 1-5 to the vertical signal line 1-9 is possible to be amplified.

One end of the SH switch 204 is connected to the output terminal of the differential amplification circuit 201 and the other end of the SH switch 204 is connected to one end of the sample capacitor 205. The other end of the sample capacitor 205 is grounded.

The reset switch 202 is a switch that resets the negative feedback capacitor 203. ON/OFF of the reset switch 202 is controlled by a column amplification circuit reset pulse ΦRST2 from the vertical reading control circuit 1-2.

The SH switch 204 is a transistor that samples and holds the voltage level of the other end of the negative feedback capacitor 203 and accumulates the voltage level in the sample capacitor 205. ON/OFF of the SH switch 204 is controlled by a column sample pulse ΦSH2 from the vertical reading control circuit 1-2. The sample capacitor 205 is a capacitor that retains the signal charge amplified by the differential amplification circuit 201, the reset switch 202, and the negative feedback capacitor 203, when the SH switch 204 is in the ON state.

Figure 5:
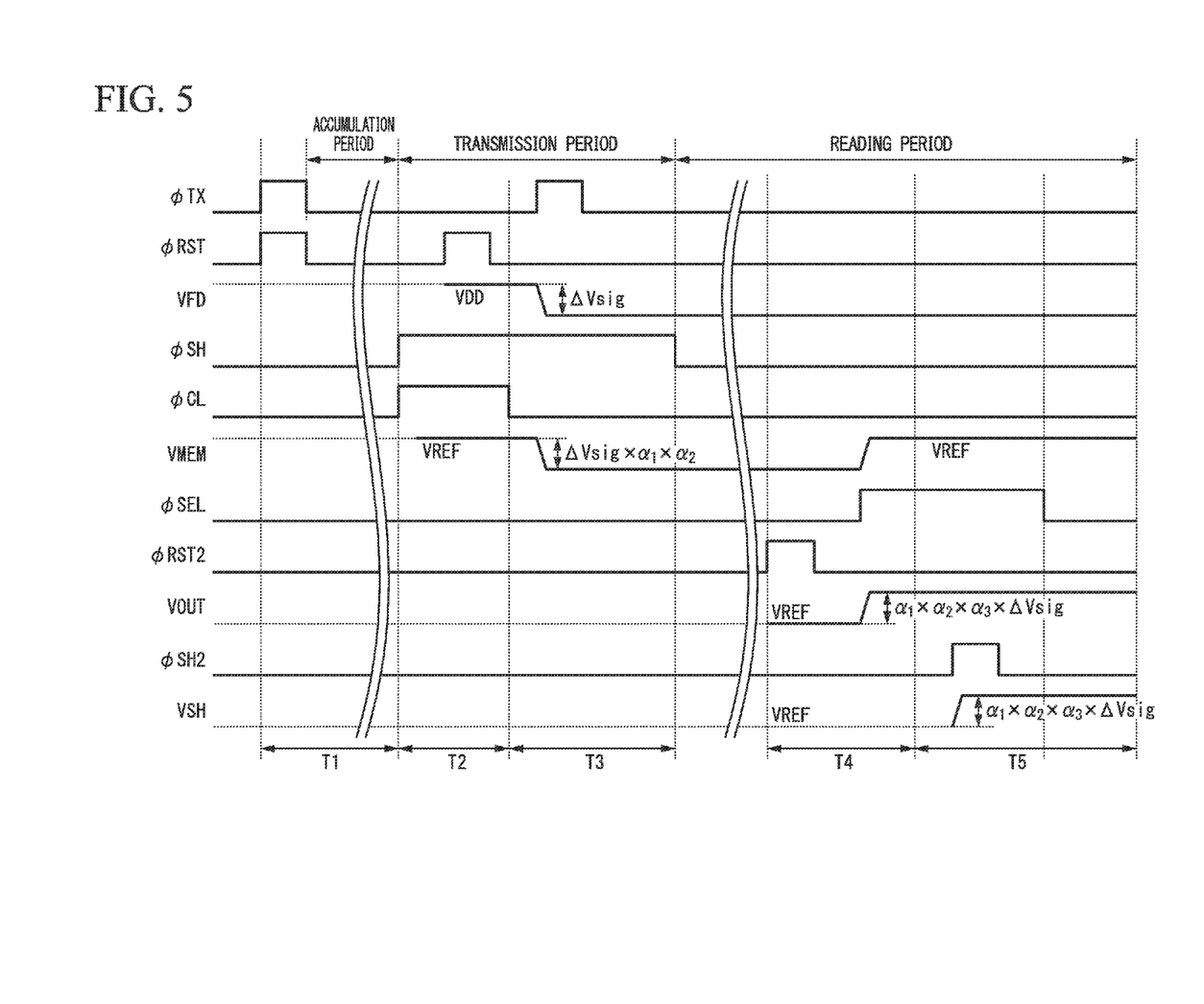
FIG. 5 is a timing chart illustrating an operation of the unit pixel of the solid-state imaging device according to the embodiment of the invention.

Next, operations of the unit pixel 1-5 and the column signal processing unit 1-6 will be described with reference to FIG. 5. FIG. 5 is a diagram illustrating the control signal supplied from the vertical reading control circuit 1-2 to the unit pixels 1-5 for each row and illustrating a potential VFD of the one end of the FD 103, a potential VMEM of the one end of the analog memory 110, an output potential VOUT of the differential amplification circuit 201, and a potential VSH of the one end of the sample capacitor 205. Hereinafter, when all of the unit pixels 1-5 are referred, the unit pixels are referred to as all of the pixels.

[Operation During Period T1]

First, when the transmission pulse ΦTX and the FD reset pulse ΦRST are changed from an "L" (Low) level to an "H" (High) level, the transmission transistor 102 and the FD reset transistor 104 are turned on. Since a period T1 is a period common to all of the pixels, the photoelectric conversion units 101 of all of the pixels are reset.

Subsequently, when the transmission pulse ΦTX and the FD reset pulse ΦRST are changed from the "H" level to the "L" level, the transmission transistor 102 and the FD reset transistor 104 are turned off. Thus, the resetting of the photoelectric conversion units 101 of all of the pixels ends and exposure (accumulation of the signal charge) of all of the pixels starts en bloc (start of an accumulation time).
[Operation During Period T2]

A period T2 is a period within an exposure period. First, when the clamp & memory reset pulse ΦCL is changed from the "L" level to the "H" level, the analog memory reset transistor 109 is turned on. Thus, the analog memory 110 is reset. Simultaneously, when the sample pulse ΦSH is changed from the "L" level to the "H" level, the sampling transistor 108 is turned on. Thus, the potential of the other end of the clamp capacitor 107 is reset to the reference voltage VREF, and the sampling transistor 108 start sampling and holding the potential of the other end of the clamp capacitor 107. Since the period T2 is a period common to all of the pixels, the analog memories 110 and the clamp capacitors 107 of all of the pixels are reset and the sampling and holding of all of the pixels is started.

Subsequently, when the FD reset pulse ΦRST is changed from the "L" level to the "H" level, the FD reset transistor 104 is turned on. Thus, the FD 103 is reset. Subsequently, when the FD reset pulse ΦRST is changed from the "H" level to the "L" level, the FD reset transistor 104 is turned off. Thus, the resetting of the FD 103 ends. A timing at which the FD 103 is reset may be within the exposure period. However, by resetting the FD 103 immediately before the end of the exposure period, noise caused due to a leakage current of the FD 103 is possible to be further reduced.

Subsequently, when the clamp & memory reset pulse ΦCL is changed from the "H" level to the "L" level, the analog memory reset transistor 109 is turned off. Thus, the resetting of the analog memory 110 ends. At this time, the clamp capacitor 107 clamps the amplified signal (the amplified signal after the FD 103 is reset) output from the amplification transistor 105.
[Operation During Period T3]

First, when the transmission pulse ΦTX is changed from the "L" level to the "H" level, the transmission transistor 102 is turned on. Thus, the signal charge accumulated in the photoelectric conversion unit 101 is transmitted to the FD 103 via the transmission transistor 102 and is accumulated in the FD 103. Since a period T3 is a period common to all of the pixels, the exposure (accumulation of the signal charge) of all of the pixels ends. Subsequently, when the transmission pulse ΦTX is changed from the "H" level to the "L" level, the transmission transistor 102 is turned off.

Subsequently, when the sample pulse ΦSH is changed from the "H" level to the "L" level, the sampling transistor 108 is turned off. Since a period T3 is a period common to all of the pixels, the sampling transistors 108 of all of the pixels end the sampling and holding of the potentials of the other ends of the clamp capacitors 107.

Hereinafter, a change in the potential VMEM of the one end of the analog memory 110 will be described. When it is assumed that ΔVsig is a change in the potential of the one end of the FD 103 by the transmission of the signal charge from the photoelectric conversion unit 101 to the FD 103 after the resetting of the FD 103 ends and α1 is a gain of the amplification transistor 105, a change ΔVamp in the potential of the source terminal of the amplification transistor 105 by the transmission of the signal charge from the photoelectric conversion unit 101 to the FD 103 is α1×ΔVsig.

When it is assumed that α2 is a sum gain of the analog memory 110 and the sampling transistor 108, a change ΔVmem in the potential of the one end of the analog memory 110 by the sampling and holding of the sampling transistor 108 after the transmission of the signal charge from the photoelectric conversion unit 101 to the FD 103 is α2×ΔVamp, that is, α1×α2×ΔVsig. ΔVsig is an amount of change in the potential of the one end of the FD 103 by the transmission of the signal charge and does not include reset noise generated by resetting the FD 103. Accordingly, when the sampling transistor 108 samples and holds the potential, the influence of the noise generated by the photoelectric conversion unit 101 is possible to be reduced.

Since the potential of the one end of the analog memory 110 at the time of ending the resetting of the analog memory 110 is the reference voltage VREF, the potential VMEM of the one end of the analog memory 110 sampled and held by the sampling transistor 108 is expressed by Equation (1) below after the transmission of the signal charge from the photoelectric conversion unit 101 to the FD 103.

$$VMEM = VREF - \Delta Vmem \quad (1)$$
$$= VREF - \alpha 1 \times \alpha 2 \times \Delta Vsig$$

Further, α2 is expressed by Equation (2) below. In Equation (2), CL is the capacitance value of the clamp capacitor 107 and CSH is the capacitance value of the analog memory 110. To further reduce reduction in gain, the capacitance value CL of the clamp capacitor 107 is preferably greater than the capacitance value CSH of the analog memory 110.

$$\alpha 2 = CL/(CL+CSH) \quad (2)$$

[Operations During Periods T4 and T5]

During periods T4 and T5, signals based on the signal charges accumulated in the analog memories 110 are sequentially read for each row. First, during the period T4, the column amplification circuit reset pulse ΦRST2 is changed from the "L" level to the "H" level, the reset switch 202 of the column amplification circuit 1-10 is turned on. When the reset switch 202 is turned on, negative feedback is applied to the differential amplification circuit 201. Therefore, since the potentials of the two input terminals of the differential amplification circuit 201 become the same, the potential of the vertical signal line 1-9 becomes the reference voltage VREF. Thus, a potential difference of both ends of the negative feedback capacitor 203 is 0 V, and thus the column amplification circuit 1-10 is in the reset state.

Subsequently, when the column amplification circuit reset pulse ΦRST2 is changed from the "H" level to the "L" level, the reset switch 202 of the column amplification circuit 1-10 is turned off. Thus, the feedback by the negative feedback capacitor 203 is applied to the differential amplification circuit 201.

Subsequently, when the select pulse ΦSEL is changed from the "L" level to the "H" level, the select transistor 111 is turned on. Therefore, an amplification circuit having the gain by the analog memory 110 and the negative feedback capacitor 203 is formed and a signal based on the signal charge accumulated in the analog memory 110 is output to the vertical signal line 1-9. The signal output to the vertical signal line 1-9 is input to the column amplification circuit 1-10.

During the period T5, when the column sample pulse ΦDSH2 is changed from the "L" level to the "H" level, the SH switch 204 is turned on. Thus, the SH switch 204 starts sampling and holding the potential of the other end of the negative feedback capacitor 203.

Subsequently, when the column sample pulse ΦSH2 is changed from the "H" level to the "L" level, the SH switch 204 is turned off. Thus, the SH switch 204 ends the sampling and holding of the potential of the other end of the negative feedback capacitor 203.

Hereinafter, a change in the output potential VOUT of the differential amplification circuit 201 will be described. It is assumed that ΔVOUT is a change in an output potential of the differential amplification circuit 201 when the column amplification circuit 1-10 reads the signal based on the potential of the one end of the analog memory 110 after the sampling and holding of the sampling transistor 108, and α3 is a gain obtained by the analog memory 110 and the negative feedback capacitor 203. In this case, the change ΔVOUT in the output potential of the differential amplification circuit 201 is α3×ΔVMEM, that is, α1×α2×α3×ΔVsig.

As described above, when the negative feedback capacitor 203 is reset by the reset switch 202, the potential of the vertical signal line 1-9 is the reference voltage VREF. Accordingly, when the signal output to the vertical signal line 1-9 is input to the column amplification circuit 1-10, the output potential VOUT of the differential amplification circuit 201 is expressed by Equation (3) below.

$$VOUT = VREF + \Delta VOUT \qquad (3)$$
$$= VREF + \alpha 1 \times \alpha 2 \times \alpha 3 \times \Delta Vsig$$

Further, α3 is expressed by Equation (4) below. In Equation (4), CFB is a capacitance value of the negative feedback capacitor 203 and CSH is a capacitance value of the analog memory 110.

$$\alpha 3 = CSH/CFB \qquad (4)$$

When the potential of the other end of the negative feedback capacitor 203 is sampled and held in the sample capacitor 205 by the SH switch 204, the potential VSH of the one end of the sample capacitor 205 is the same as the output potential VOUT expressed by Equation (3) above.

The analog signal accumulated in the sample capacitor 205 is appropriately subjected to an analog conversion process by the column signal processing unit 1-6 and the processed signal is output to the horizontal signal line 1-7 by the horizontal reading control circuit 1-3. The output circuit 1-8 processes the signal output to the horizontal signal line 1-7 and outputs the signal as a pixel signal.

The operations during the above-described periods T4 and T5 are sequentially performed in each row of the pixel array unit 1-4. When the operations during the periods T4 and T5 end in all of the rows of the pixel array unit 1-4, the reading of the signal from the all of the pixels ends.

In the above-described operations, the FD 103 has to retain the signal charge transmitted from the photoelectric conversion unit 101 to the FD 103 until the reading timing of each unit pixel 1-5. When noise generates during the period in which the FD 103 retains the signal charge, the noise is superimposed on the signal charge retained by the FD 103, and thus signal quality (S/N) may deteriorate.

The main cause of the noise generating during the period (hereinafter referred to as a retention period) in which the FD 103 retains the signal charge is a charge (hereinafter referred to as a leakage charge) caused due to a leakage current of the FD 103 and a charge (hereinafter referred to as an optical charge) caused due to light incident on a portion other than the photoelectric conversion unit 101. When it is assumed that qid and qpn are the leakage charge and the optical charge generating during a unit time, respectively, and tc is the retention period, a noise charge Qn generating during the retention period is expressed by (qid+qpn)×tc.

It is assumed that Cfd is the capacity of the FD 103, CSH is the capacity of the analog memory 110, and A is a ratio (CSH/Cfd) of CSH to Cfd. As described above, it is assumed that α1 is the gain of the amplification transistor 105 and a2 is the sum gain of the analog memory 110 and the sampling transistor 108. When Qph is assumed to be a signal charge generated during the exposure period by the photoelectric conversion unit 101, a signal charge retained in the analog memory 110 after the end of the exposure period is A×α1×α2×Qph.

A signal based on the signal charge transmitted from the photoelectric conversion unit 101 to the FD 103 is sampled and held by the sampling transistor 108 during the period T3 and is stored in the analog memory 110. Accordingly, since a time from the transmission of the signal charge to the FD 103 to the storage of the signal charge in the analog memory 110 is short, the noise generating by the FD 103 can be ignored. When it is supposed that the noise generating during the period in which the analog memory 110 retains the signal charge is the same as Qn described above, S/N is A×α1×α2×Qph/Qn.

On the other hand, as in the technology of the related art disclosed in Japanese Unexamined Patent Application, First Publication No. 2010-219339, S/N is Qph/Qn when the signal charge is transmitted from the photoelectric conversion unit to the accumulation capacitor unit without passing through the amplification transistor. Accordingly, S/N of this embodiment is A×α1×α2 times S/N of the technology of the related art. By setting the capacity value of the analog memory 110 (for example, the capacity value of the analog memory 110 is set to be sufficiently greater than the capacity value of the FD 103) so that A×α1×α2 is greater than 1, the deterioration in the signal quality is possible to be reduced.

Figure 6:
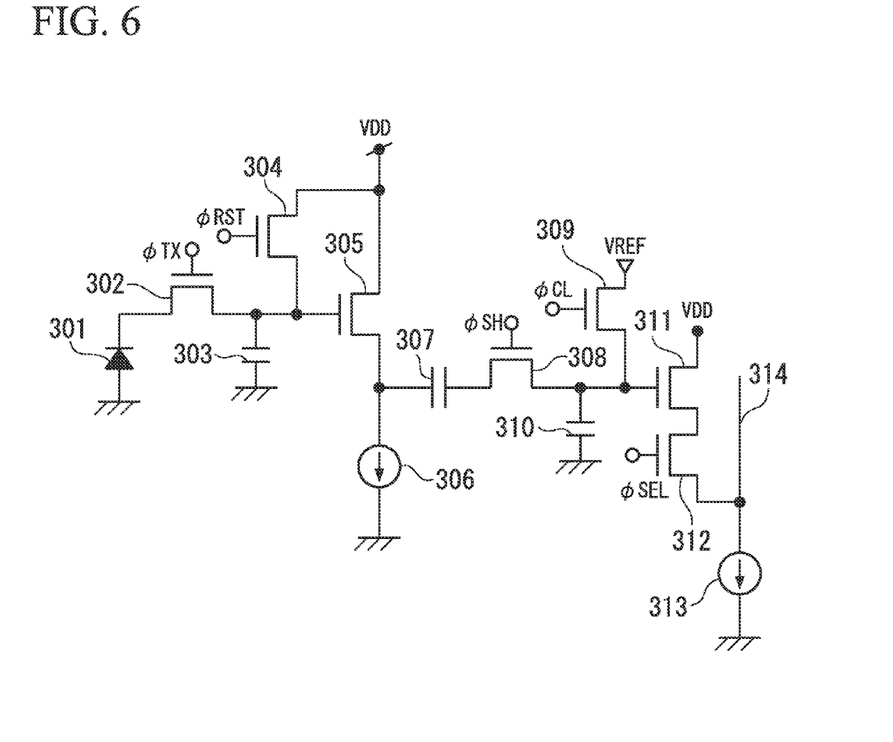
FIG. 6 is a circuit diagram illustrating another circuit configuration of the unit pixel of the solid-state imaging device.

A configuration shown in FIG. 6 is possible to be considered as another circuit configuration capable of reducing the deterioration in the signal quality caused due to the leakage charge of the FD. Hereinafter, the configuration of a circuit shown in FIG. 6 will be described. The circuit shown in FIG. 6 includes a photoelectric conversion unit 301, a transmission transistor 302, an FD 303, an FD reset transistor 304, a first amplification transistor 305, a first current source 306, a clamp capacitor 307, a sampling transistor 308, an analog memory reset transistor 309, an analog memory 310, a second amplification transistor 311, a select transistor 312, and a second current source 313.

Hereinafter, only differences from the circuit configuration shown in FIG. 4 will be described. A drain terminal of the second amplification transistor 311 is connected to a power-supply voltage VDD. A gate terminal that forms an input unit of the second amplification transistor 311 is connected to a source terminal of the sampling transistor 308. A drain terminal of the select transistor 312 is connected to a source terminal of the second amplification transistor 311 and a source terminal of the select transistor 312 is connected to a vertical signal line 314. A gate terminal of the select transistor 312 is connected to a vertical reading control circuit.

The second amplification transistor 311 is a transistor that outputs an amplified signal, which is obtained by amplifying a signal based on a signal charge input to the gate terminal and accumulated in the analog memory 310, from the source terminal. The second amplification transistor 311 and the second current source 313, which is connected to the vertical signal line 314 and serves as a load, form a source follower circuit. The select transistor 312 is a transistor that selects the unit pixels and transmits an output of the second amplification transistor 311 to the vertical signal line 314. ON/OFF of the select transistor 312 is controlled by a select pulse ΦSEL from the vertical reading control circuit.

In the circuit shown in FIG. 6, operations until a signal charge based on the light generated in the photoelectric conversion unit 301 is stored in the analog memory 310 are the same as the operations of the periods T1 to T3 in FIG. 5. Thereafter, the select transistor 312 is turned on, and the signal based on the signal charge stored in the analog memory 310 is output to the vertical signal line 314 via the second amplification transistor 311 and the select transistor 312.

The circuit shown in FIG. 6 is possible to reduce the deterioration in the signal quality caused due to the leakage charge of the FD more than the technology of the related art disclosed in Japanese Unexamined Patent Application, First Publication No. 2010-219339. However, the gain of the first amplification transistor 305, the sum gain of the sampling transistor 308 and the analog memory 310, and the gain of the second amplification transistor 311 are each equal to or less than 1. Therefore, the amplitude of the signal output to the vertical signal line 314 is considerably attenuated. The gain of the first amplification transistor 305 in FIG. 6 corresponds to the gain α1 of the amplification transistor 105 in FIG. 4. The sum gain of the sampling transistor 308 and the analog memory 310 in FIG. 6 corresponds to the sum gain α2 of the sampling transistor 108 and the analog memory 110 in FIG. 4.

The gain of the second amplification transistor 311 in FIG. 6 is about 0.8 and the gain α3 obtained by the analog memory 110 and the negative feedback capacitor 203 in FIG. 4 is set to be equal to or greater than 0.8. Therefore, the circuit shown in FIG. 4 is possible to reduce the attenuation of the amplitude of the signal more than the circuit shown in FIG. 6. As expressed in Equation (4), α3 is a ratio of the capacity value of the analog memory 110 to the capacity value of the negative feedback capacitor 203 and is possible to be set to an appropriate value. The gain α1 of the amplification transistor 105 is about 0.8 and the sum gain α2 of the sampling transistor 108 and the analog memory 110 is about 0.75. For example, the value of α3 is set to 1.67, so that α1×α2×α3 becomes 1. Accordingly, the value range of α3 is, for example, equal to or greater than 0.8 and equal to or less than 1.67. The value range of α3 is not limited thereto, but a3 may be set to be greater than 1.67.

According to this embodiment, as described above, the circuit components constituting the pixels are each provided in two substrates and the amplified signal output from the amplification transistor 105 is stored in the analog memory 110 without being digitized. Thus, an increase in a chip area is possible to be suppressed (the number of pixels is possible to be easily increased). Further, by providing the analog memory 110, the deterioration in the signal quality is possible to be reduced. Furthermore, by providing the differential amplification circuit 201, the attenuation of the amplitude of the signal is possible to be reduced.

The number of transistors and the number of wirings is possible to be reduced and the area is possible to be reduced, compared to the circuit shown in FIG. 6. Further, since the second amplification transistor 311 in FIG. 6 is not included and the source follower is thus not configured, a current source is not necessary. That is, the power consumption is possible to be reduced.

When a signal is output from the unit pixel via a source follower, as in the circuit disclosed in Japanese Unexamined Patent Application, First Publication No. 2010-219339 or shown in FIG. 6, a reading speed may deteriorate or the power consumption may increase depending on the size of a parasitic capacity generating in the vertical signal line. In this embodiment, since a signal amplification ratio is determined according to the ratio of the capacity value of the analog memory 110 of the unit pixel 1-5 to the capacity value of the negative feedback capacitor 203 of the column amplification circuit 1-10 and a signal is output from the unit pixel 1-5 without passing through the source follower, a design is possible to be realized with a relatively high degree of freedom so that there is no influence of the size of the parasitic capacity of the vertical signal line 1-9 and the deterioration in the reading speed or the increase in the power consumption is possible to be suppressed.

Since the area of the photoelectric conversion unit in the first substrate is possible to be enlarged compared to a case in which all of the circuit components of the pixel are provided in one substrate, sensitivity is improved. Further, by using the analog memory, the area of a signal accumulation region provided in the second substrate is possible to be reduced.

Since the photoelectric conversion units 101 of all of the pixels start the exposure (accumulation of the signal charges) en bloc, distortion of a subject in an image is possible to be reduced. Further, it is possible to realize a global shutter function in which the photoelectric conversion units 101 of all of the pixels start and end the exposure (accumulation of the signal charges) en bloc.

The capacity value of the analog memory 110 is set to be greater than the capacity value of the FD 103 (for example, the capacity value of the analog memory 110 is set to be five times the capacity value of the FD 103). Thus, the signal charge retained by the analog memory 110 is greater than the signal charge retained by the FD 103. Therefore, it is possible to reduce the influence of the signal deterioration caused due to the leakage current of the analog memory 110.

By providing the clamp capacitor 107 and the sampling transistor 108, it is possible to reduce the noise generating in the first substrate 20. As the noise generating in the first substrate 20, there is noise (for example, reset noise) that originates from an operation of a circuit (for example, the FD reset transistor 104) connected to the amplification transistor 105 and generates in the input unit of the amplification transistor 105, or noise (for example, noise caused due to a variation in a circuit threshold value of the amplification transistor 105) that originates from the operation characteristics of the amplification transistor 105.

The embodiment of the invention has been described in detail with reference to the drawings. However, the specific configuration is not limited to the above-described embodiment, but may include design modification or the like within the scope of the invention without departing from the gist of the invention. The configuration of the solid-state imaging device in which two substrates are connected by the connection portions has been described, but three or more substrates may be connected by the connection portions. In a solid-state imaging device in which three or more substrates are connected by the connection portions, two substrates among the three or more substrates correspond to the first and second substrates. The preferred embodiment of the invention has been described, but the invention is not limited to the embodiment. Addition, omission, or substitution of the configurations and other modifications can be made within the scope of the invention without departing from the gist of the invention. The invention is not limited to the above description and is limited only by the appended claims.

What is claimed is:

1. A solid-state imaging device in which first and second substrates in which circuit components constituting each pixel are arranged are electrically connected to each other,
wherein the pixel includes
a photoelectric conversion unit that is arranged in the first substrate,
an amplification circuit that amplifies a signal generated by the photoelectric conversion unit and outputs the amplified signal,
a signal accumulation circuit that is arranged in the second substrate and accumulates the amplified signal output from the amplification circuit,
a selection circuit that electrically connects the signal accumulation circuit to a vertical signal line and selects one of a first state in which the amplified signal accumulated in the signal accumulation circuit is output to the vertical signal line and a second state in which the signal accumulation circuit is electrically disconnected from the vertical signal line, and
a differential amplification circuit that includes a first input terminal connected to a predetermined voltage and a second input terminal connected to the vertical signal line.

2. The solid-state imaging device according to claim 1, wherein the predetermined voltage is a voltage which is the same as a voltage applied to a clamp unit, when the clamp unit starts clamping the amplified signal.

3. The solid-state imaging device according to claim 2, further comprising:
a feedback switch that switches between an ON state and an OFF state; and
a feedback capacitor,
wherein the vertical signal line, one end of the feedback switch, and one end of the feedback capacitor are connected to the second input terminal of the differential amplification circuit, and
wherein the another end of the feedback switch and the another end of the feedback capacitor are connected to an output terminal of the differential amplification circuit.

4. The solid-state imaging device according to claim 3, wherein the differential amplification circuit amplifies the amplified signal output to the vertical signal line by an amplification ratio corresponding to the signal accumulation circuit and the feedback capacitor.

5. The solid-state imaging device according to claim 1, further comprising:
a noise reduction circuit that reduces noise in the amplified signal output from the amplification circuit.

6. The solid-state imaging device according to claim 5, wherein the noise reduction circuit removes at least one of noise which originates from an operation of a circuit connected to the amplification circuit and generates in an input unit of the amplification circuit, and noise which originates from operation characteristics of the amplification circuit.

7. The solid-state imaging device according to claim 6, wherein the noise reduction circuit includes
a clamp unit that clamps the amplified signal output from the amplification circuit, and
a sample-and-hold unit that samples and holds a signal according to the amplified signal clamped by the clamp unit and accumulates the signal in the signal accumulation circuit.

* * * * *